May 10, 1949.
F. I. ERNEST
2,469,873
PRECISION EXPANDING ADAPTER
Filed April 16, 1945
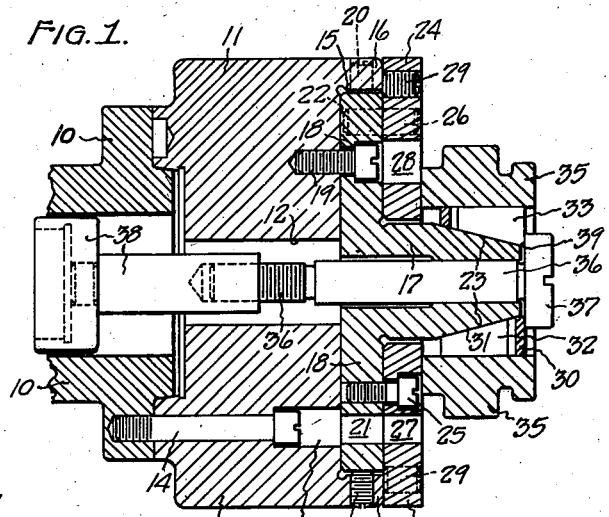
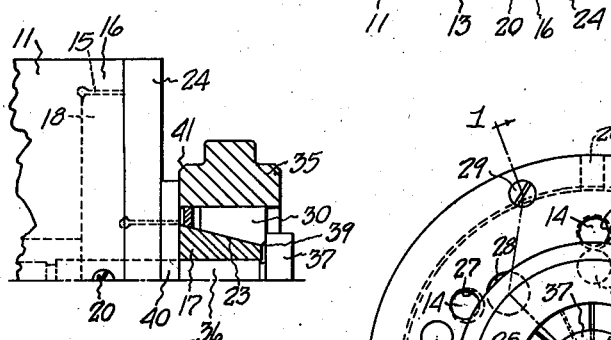
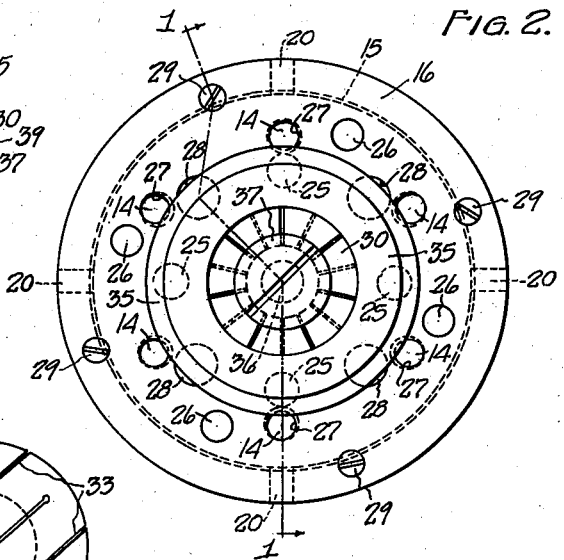
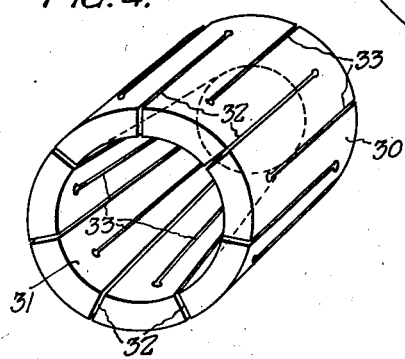
FREDERICK I. ERNEST.
INVENTOR.
BY Altsch & Knoblock
Attorneys.

Patented May 10, 1949

2,469,873

UNITED STATES PATENT OFFICE 2,469,873

PRECISION EXPANDING ADAPTER

Frederick I. Ernest, Elkhart, Ind.

Application April 16, 1945, Serial No. 588,701

4 Claims. (Cl. 279—2)

This invention relates to a precision expanding adapter. More particularly the invention relates to an adapter for holding a partly processed work piece having an accurately machined bore in precise desired location. It is frequently necessary, in machining a work piece, to perform certain operations thereon, such as the operations of boring the same and finishing one or more surfaces thereof, in one machine while held in a chuck or other work holder; and then to perform other operations, such as the finishing of other surfaces thereof, in a different machine while mounted in a different work holder which exposes surfaces thereof which were not accessible during the initial operation. The accuracy of the latter operations and of the completed work piece depends entirely upon the centering and locating of the work piece preparatory to and during the latter operations.

The primary object of this invention is to provide an adapter which will accurately locate a partially machined work piece with reference to a machine spindle or to any given axis.

A further object is to provide an expanding adapter for rigidly holding a work piece while the same is being machined.

A further object is to provide an expanding adapter having a rigid tapered spindle, and an expansible bushing having a tapered bore fitting on said spindle and within the bore of a work piece whereby the spindle and the work piece cooperate to hold the expansible sleeve rigid and the sleeve automatically centers itself and the work.

A further object is to provide an adapter having a body, a rigid spindle, and a self-centering expansible sleeve, wherein means are provided to accurately center the spindle on the body and to hold the work piece in predetermined position longitudinally and angularly relative to the spindle.

A further object is to provide an adapter of the self-centering type which may be used on any type of metal working or cutting machine.

A further object is to provide an adapter having a rigid spindle and a self-centering expansible sleeve that expands uniformly throughout its entire length.

Other objects will be apparent from the description and appended claims.

In the drawing:

Fig. 1 is a longitudinal sectional view of the adapter taken on line I—I of Fig. 2.

Fig. 2 is an end view of the adapter.

Fig. 3 is a fragmentary side view of a modified arrangement of the adapter, with parts shown in section.

Fig. 4 is a perspective view of the expansible sleeve.

Referring to the drawing, which illustrates the preferred embodiment of the invention, the numeral 10 designates a portion of the machine, such as a lathe, milling machine, grinder, or the like, to which the adapter is to be secured. Part 10 may be rotatable or may be a stationary positioning member.

The adapter has a body portion 11 provided with an axial bore 12 and with a plurality of equi-spaced stepped bores 13 adapted to receive bolts or cap screws 14 by means of which the body may be secured to part 10. The front face of body 11 preferably has a concentric cylindrical recess 15 formed therein to define an annular forwardly projecting marginal rim portion 16.

A rigid spindle 17 has a rigid circular end flange 18 of a radius slightly smaller than the radius of recess 15 and of a thickness equal to or greater than the depth of recess 15. Flange 18 seats in recess 15 and has a plurality of stepped bores therein which receive bolts or cap screws 19 by means of which it is secured to body 11. Rim portion 16 of body 11 has a plurality of threaded radial bores therein which mount set screws 20 bearing against the periphery of flange 18 and providing means for accurately centering spindle 17 relative to parts 10 and 11 preparatory to tightening of bolts 19. Flange 18 is also provided with access passages 21 therethrough substantially in registration with bores 13 in body 11, and with bores 22. Spindle 17 has an axial bore extending therethrough, and the outer periphery of its end portion is tapered at 23.

A face plate 24 has an axial bore of a diameter greater than the diameter of spindle 17 and fits freely around said spindle in face engagement with flange 18. The plate 24 is preferably of a diameter substantially equal to the diameter of body 11, and has an accurately machined plane front or outer surface. A plurality of stepped bores are formed in the plate to receive bolts or cap screws 25 by means of which the plate is secured to flange 18. The plate may also mount a plurality of studs 26 fitting in bores 22 of flange 18 to further steady and solidly position said plate. A plurality of passages 27 are formed in plate 24 in registration with passages 21 and bores 13 for access to bolts 14; and a plurality of passages 28 are formed in plate 24 in registration with the bores receiving bolts 19 for access to said bolts. A set of tapped openings is formed in the margin of plate 24 to receive set screws 29 by which the angular position of the outer face of plate 24 may be adjusted accurately in true perpendicular relation to the axis of spindle 17, in cooperation with bolts 25. Plate 24 is preferably of such thickness that it fits around the cylindrical portion of spindle 17, i. e. is spaced inwardly from the tapered spindle portion 23.

An expanding sleeve or bushing 30 has a tapered bore 31 therein, the taper of which accurately matches the taper of spindle portion 23, and the outer face of which is accurately or truly perpendicular to the axis of the bore 31. The tapered bore communicates with a chamfered portion 39, whereby the minimum diameter portion of said bore, which is substantially equal to the diameter of the end of the spindle, is positioned intermediate the ends of the bushing. A plurality of equi-spaced similar longitudinal kerfs 32 are formed in the bushing and extend from one end thereof for the major portion of the length of the bushing, and a second set of equi-spaced similar longitudinal kerfs 33 extend from the opposite end of the bushing and are of the same length as kerfs 32 and are positioned in alternate relation thereto. A plurality of bushings 30 of different outer diameters will preferably be supplied with each adapter to accommodate the adapter to work pieces 35 having bores of different diameters. Also, the bushing in small sizes may be a simple split bushing or other expansible bushing constructions may be employed.

A draw screw 36 fits in the axial bore of spindle 17 and projects into the bore 12 of body 11. Screw 36 mounts a head 37 of a diameter greater than the small diameter end of the spindle. The inner end of the screw is threaded into a draw screw adapter 38 projecting into the body bore 12 and adapted to be connected with suitable power means (not shown) on the machine which mounts the adapter for operation thereby to draw the screw 36 inwardly. It will be noted in Fig. 1 that the tapered portion 23 of spindle 17 has a snug fit around screw 36. This is important to insure rigidity of the spindle.

In the use of the adapter, it is secured to a machine at portion 10 thereof by means of bolts 14, and the centered relation of spindle 17 in the body and the perpendicular relation of the outer surface of face plate 24 to the axis of the adapter and the machine are checked and adjusted. Bushing 30 and work piece 35 are then mounted on the spindle. Where one end surface of the work piece, as well as the bore thereof, has been finished accurately, the work piece is positioned as illustrated in Fig. 1 with its finished end surface in face engagement with plate 24 to insure against tilting of the work piece relative to the spindle. If the work piece does not have a finished end surface, it is preferably centered longitudinally on the bushing with its inner face spaced from plate 24. The draw screw 26 is then inserted in the spindle and threaded in its adapter 38 until its head 37 bears firmly against the outer face of the bushing. The bushing is so proportioned that a portion thereof projects beyond the end of the spindle, as illustrated in Fig. 1, to permit limited longitudinal movement of the draw screw by its operating means without interference from the spindle. During such movement the bushing is shifted toward the large diameter portion of the spindle and is uniformly expanded as accommodated by the kerfs 32, 33. As the bushing expands it moves into a firm frictional engagement with the bore of the work piece 35, retaining an accurately centered relation with the spindle and holding the work piece in the same central relation. Consequently the work piece can be mounted easily and quickly, with assurance that it is accurately centered, so that further machining operations will be accurate with relation to previous operations.

The device possesses many advantages to which brief reference will be made. First, the device is rigid, thus overcoming a primary source of difficulty with previous expansible adapters. This rigidity is achieved by the solid or rigid character of the spindle and the positioning of the expanding bushing between the spindle and the work piece so that it cannot yield or move when the parts are operatively associated. Another advantage is that the adapter can be removed from one machine and mounted upon a different machine, with minimum disassembly of parts required for this purpose. A third advantage is that the set screws 20 and 29 provide for micrometric adjustment of the position of the parts, with respect to concentricity and angular position whenever the adapter is changed from one machine to another. Another advantage of the device is that, if a given eccentricity of mounting of the work piece is desired, it can be obtained by adjustment, or by substitution of an eccentric spindle unit, and the same eccentricity can be obtained when the work piece is remounted after initial partial machining. Another advantage is that face plate 24 insures against tilting of the work as it is mounted on the adapter. Another advantage is that the work piece 35 can be held in firm frictional engagement with face plate 24, thereby insuring against slippage of the work piece on its mounting.

It will be understood that the face plate 24 may be dispensed with in cases where it is not needed or where it interferes with desired machining. For instance, if a bore is the only finished surface of a work piece, plate 24 is not needed and its elimination may be desirable to provide space ample to permit machining of the inner end face of the work piece as well as its outer end face and outer peripheral surface, as in a lathe. Another alternative arrangement of the adapter is shown in Fig. 3 wherein a spacer ring 40 of a diameter less than the outer diameter of the work piece is interposed between the work piece and the plate 24. Thus, assuming the bore and inner face of the work piece have been machined previously, the ring 40 provides a bearing and positioning member with which the finished end surface of the work piece is engageable, and yet provides ample space or clearance for an operation upon the inner end of the work piece, such as the operation of forming chamfer 41.

I claim:

1. A precision expanding adapter for mounting a work piece having a finished bore and a finished end surface, comprising a body, a rigid tapered spindle carried by and projecting from said body, means for centering said spindle on said body, a face plate, means for adjusting the angular relation of the outer surface of said plate to the axis of said spindle and engageable by the finished surface of said work piece, a unitary uniformly expanding sleeve fitting in the bore of said work piece and having a tapered bore mounted on said spindle outwardly of said face plate, and means for shifting said bushing longitudinally on said spindle.

2. A precision expanding adapted for mounting a work piece having a finished bore and a finished end face, comprising a body having an end surface, a rigid tapered spindle projecting from said body, means for locating said spindle in predetermined angular relation to said face and on a selected axis, an expansible unitary bushing having a tapered bore fitting on said spindle, and means for shifting said bushing on said spindle, said work piece encircling said spindle and bushing with its finished face in engagement with said body face.

3. A precision expanding adapter for a work piece having a bore and a face both accurately finished, comprising a body, a rigid tapered spindle projecting from one end of said body, a face plate carried by said body and fitting around the inner end of said spindle, means for adjusting the angular relation between said plate and the axis of said spindle, an expansible unitary bushing having a tapered bore mounted slidably on said spindle, and means for longitudinally shifting said bushing on said bore, said work piece encircling said bushing with its finished face engaging said face plate.

4. A precision expanding adapter for a work piece having a bore, comprising a body having a recessed face defining a marginal rim, a rigid tapered spindle having a rigid enlarged disc secured in said recess, disc centering means carried on said rim and engaging the periphery of said disc, an annular face plate encircling said spindle and secured to said disc, set screws carried by said face plate and engaging said body for adjusting the angular relation of the outer surface of said plate relative to the axis of said spindle, an expansible unitary bushing mounting said work piece and having a tapered bore fitting on said spindle, and means for shifting said bushing on said spindle.

FREDERICK I. ERNEST.

REFERENCES CITED

The following references are of record in the file of this patent:

UNITED STATES PATENTS

| Number | Name | Date |
|---|---|---|
| 1,431,761 | Schlaupitz | Oct. 10, 1922 |
| 2,276,945 | Ehrich | Mar. 17, 1942 |

FOREIGN PATENTS

| Number | Country | Date |
|---|---|---|
| 499,266 | Germany | May 15, 1930 |

OTHER REFERENCES

American Machinist Mag., "Tool Chucks and Fixtures," published by Industrial Press, by A. Dowd, 1915, page 78. (Patent Office Library.) (Copy in Div. 52.)